United States Patent
Sulkowski

(10) Patent No.: US 12,030,503 B2
(45) Date of Patent: Jul. 9, 2024

(54) VEHICLE MOVEMENT SENSOR

(71) Applicant: Aptiv Technologies AG, Schaffhausen (CH)

(72) Inventor: Tomasz Sulkowski, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 283 days.

(21) Appl. No.: 17/652,916

(22) Filed: Feb. 28, 2022

(65) Prior Publication Data
US 2022/0289202 A1    Sep. 15, 2022

(30) Foreign Application Priority Data

Mar. 9, 2021 (GB) ..................................... 2103232

(51) Int. Cl.
*B60W 40/06* (2012.01)
*G06V 10/44* (2022.01)

(52) U.S. Cl.
CPC ............ *B60W 40/06* (2013.01); *G06V 10/443* (2022.01); *B60W 2420/40* (2013.01); *B60W 2520/10* (2013.01); *B60W 2520/14* (2013.01)

(58) Field of Classification Search
CPC ................................................... B60W 40/06
See application file for complete search history.

(56) References Cited

U.S. PATENT DOCUMENTS

| | | | |
|---|---|---|---|
| 5,652,655 A | 7/1997 | Uno et al. | |
| 6,130,706 A * | 10/2000 | Hart, Jr. ..................... | G01P 3/38 382/104 |
| 9,869,064 B2 | 1/2018 | Akashi et al. | |
| 10,107,469 B2 * | 10/2018 | Nakazawa ............ | F21S 41/663 |
| 2004/0221790 A1 * | 11/2004 | Sinclair ..................... | G01P 3/36 356/4.03 |
| 2006/0095172 A1 * | 5/2006 | Abramovitch ......... | G01C 21/26 701/28 |
| 2022/0289202 A1 * | 9/2022 | Sulkowski ............. | G06V 20/56 |
| 2023/0159081 A1 * | 5/2023 | Sulkowski ............... | G06T 7/20 74/484 R |

FOREIGN PATENT DOCUMENTS

| | | |
|---|---|---|
| DE | 29721261 U1 | 1/1998 |
| DE | 4313497 C2 | 3/2000 |
| DE | 102006050850 A1 | 4/2008 |

(Continued)

OTHER PUBLICATIONS

"Extended European Search Report", EP Application No. 22157038. 5, Sep. 9, 2022, 7 pages.

(Continued)

*Primary Examiner* — Michael A Berns
(74) *Attorney, Agent, or Firm* — Harness, Dickey & Pierce, P.L.C.

(57) ABSTRACT

Vehicle movement sensor for a vehicle travelling on a road surface. An optoelectronic sensor from a first sample area on the road surface at a first location relative to the vehicle and generating a pixel pattern image of road surface irregularities in the first sample area. A processor for sampling pixel pattern images of the first sample area and determining movement of the vehicle using digital image correlation of sequential sampled pixel pattern images of the first sample area.

20 Claims, 3 Drawing Sheets

(56) References Cited

FOREIGN PATENT DOCUMENTS

| EP | 1865465 | A1 | 12/2007 |
| JP | 106230018 | A | 8/1994 |
| JP | 4824522 | B2 | 11/2011 |

OTHER PUBLICATIONS

"Correvit S-350: 2-axis optical sensors", Kistler, Retrieved from https://www.kistler.com/en/product/type-cs350a/ on Feb. 12, 2022.
"Search Report", GB Application No. 2103232.1, Aug. 12, 2021, 3 pages.

* cited by examiner

VEHICLE MOVEMENT SENSOR

CROSS-REFERENCE TO RELATED APPLICATION

This application claims priority to United Kingdom Patent Application Number 2103232.1, filed Mar. 9, 2021, the disclosure of which is hereby incorporated by reference in its entirety herein.

BACKGROUND

Autonomous driving systems rely on the accurate tracking of a vehicle's position and movement. For this, conventional systems typically use a Global Positioning System (GPS) sensor in combination with the vehicle's Anti-lock Brake Sensors (ABS). However, such methods can be inaccurate in some scenarios. For example, GPS sensors loose accuracy in noisy environments, and can become entirely non-functional when a vehicle is inside a shielded building or underground. Equally, whilst an ABS tachometer is accurate at higher speeds, their resolution is normally too low for accurate positional determination in low-speed situations, such as when the vehicle is in a traffic jam. For example, a vehicle's wheels can have a different radius due to variances in tire pressure and wear, and wheels may be misaligned. As such, even where wheel rotation is measured relatively accurately, and differences in rotations between different wheels are measured, it is nevertheless still difficult to precisely determine longitudinal motion or yaw. If a vehicle is in a traffic jam, for instance, it cannot be determined with any accuracy whether the vehicle has switched lanes or turned to avoid an obstacle. As such, in these scenarios, the autonomous driving system may lose awareness of where the vehicle precisely is.

There have been efforts to improve the accuracy of ABS-based systems. For example, JP 4 824 522 B2 discloses using video camera image recognition of road markings to calibrate its wheel rotation meter. Specifically, this is achieved by tracking the white line road markings on a highway and, based on these having a fixed size and spacing, determining a wheel rotation to distance coefficient. Nevertheless, such a system still relies upon wheel rotation to determine the actual distance travelled. As such, its accuracy remains limited when using this measurement at low speed because the number of wheel rotations is relatively few. Furthermore, the system relies upon the white line road markings being consistent, which is not always the case in a real-world scenario, especially on older roads where markings may be worn or faded. Moreover, such a system does not address the problem of measuring vehicle yaw.

In view of the above, there remains a need for an improved sensor for determining a vehicle's movement.

SUMMARY

The present disclosure relates to a vehicle movement sensor and, in particular, an optical movement tracking sensor system for a vehicle.

According to a first aspect, there is provided a vehicle movement sensor for a vehicle travelling on a road surface, including: an optoelectronic sensor for receiving light from a first sample area on the road surface at a first location relative to the vehicle and generating a pixel pattern image of road surface irregularities in the first sample area; and a processor for sampling pixel pattern images of the first sample area and determining movement of the vehicle using digital image correlation of sequential sampled pixel pattern images of the first sample area.

In this way, movement of the vehicle can be accurately tracked based on the cross correlation of patterns of pixels between successive optoelectronic images of the road surface, in a similar way to how an optical computer mouse tracks movement across a surface. That is, small differences in the road surface, caused by, for example, its surface asperities and texture, as well as its granular composition, may be detected as a pixel pattern in an image taken by the optoelectronic sensor. As the vehicle moves, an identified pattern of pixels will be offset in each subsequent sample image. This optical flow can then be determined by the processor to calculate the distance moved by the vehicle. Accordingly, by sampling images from the optoelectronic sensor, the movement of the vehicle can thereby be continually tracked. Furthermore, the tracking can determine even small movements in any direction over the two-dimensional plane of the road surface, and therefore can accurately measure both forward/reverse movements as well as yaw movements. Importantly, the system does not require image recognition of road features such as road markings, which would necessitate the use of complex multi-frame processing to locate features in a high-resolution image and track movement in 3D space. In contrast, the described movement sensor may track the 2D movement of pixel patterns in successive sampled images from a low-resolution optoelectronic sensor, thereby simplifying processing and allowing relatively low-cost components to be used.

In embodiments, the optoelectronic sensor is further for receiving light from a second sample area on the road surface at a second location relative to the vehicle, wherein the second location is a further distance from the optoelectronic sensor than the first location, and wherein the processor is further for sampling pixel pattern images of the second sample area and determining movement of the vehicle using digital image correlation of sequential sampled pixel pattern images of the second sample area. In this way, the movement of the vehicle can be tracked based on patterns of pixels from a second area of the road surface which is further away from the optoelectronic sensor. As such, due to the effect of perspective, the size of the sampled surface area may be larger for the same number of pixels forming the image. This provides a larger region within which to track pixel patterns and hence may allow improved movement detection at higher speeds. Preferably, the second location is a further distance in front or behind of the first location.

In embodiments, the processor includes an output for outputting a determined movement of the vehicle using digital image correlation of sampled pixel pattern images of one of the first sample area and the second sample area; and wherein the processor is configured to output the determined movement using pixel pattern images of the first sample area when the vehicle speed is below a predetermined threshold, and wherein the processor is configured to output the determined movement using pixel pattern images of the second sample area when the vehicle speed is above a predetermined threshold. In this way, when the vehicle is travelling at lower speeds, movement is determined using the first sample area, thereby providing greater accuracy at low speeds. Conversely, at higher speeds, movement is determined using the second sample area, which provides a larger region for allowing patterns to be tracked even when they are moving rapidly relative to the sensor.

In embodiments, the processor is configured to increase the distance of the second location from the optoelectronic sensor proportionally to an increase in the vehicle speed above the predetermined threshold. In this way, once the speed of the vehicle is above a threshold, the area of the road surface sampled to determine movement is shifted further away from the optoelectronic sensor with increasing vehicle speed. This progressively increases the size of the road surface area being sampled and hence provides for improved tracking as surface patterns move more rapidly relative to the optoelectronic sensor.

In embodiments, the vehicle movement sensor further includes a lens for focusing light onto the optoelectronic sensor. In this way, a lens may be used to focus light onto an imager plane of the optoelectronic sensor. This may thereby allow reflected light over a large area of the road surface to be focused for detection. In embodiments, the lens is a fisheye lens for providing a wide-angle view. In embodiments, the lens may be a wide-angle lens for focusing reflected light from the first and second sample areas onto the optoelectronic sensor.

In embodiments, the lens and optoelectronic sensor are configured to provide a depth of field of 5 cm or more for the image of the first sample area. In embodiments, the lens and optoelectronic sensor are configured to provide a depth of field of 2.5 cm or more above and below the road surface. In this way, the movement sensor may tolerate vertical movement of the vehicle relative to the road surface caused by, for example, features of the road surface itself or movement of the vehicle's chassis on its suspension.

In embodiments, the lens focusses an image of the road surface onto the optoelectronic sensor, the focused image encompassing the first sample area and the second sample area. In this way, both the first and second sample areas may be covered by a single optoelectronic sensor, which can therefore be secured in a fixed position to the vehicle. In embodiments, the optoelectronic sensor may be secured to the undercarriage of the vehicle.

In embodiments, the optoelectronic sensor includes a complementary metal-oxide semiconductor (CMOS) imager. In this way, a low-cost, high refresh rate imager may be provided. Furthermore, in embodiments, the CMOS imager may be integrated with the image processor to provide a combined assembly. This thereby provides for a more compact and cost-effective assembly.

In embodiments, the optoelectronic sensor may be provided as a camera assembly. The camera assembly may include a lens and imager.

In embodiments, the processor applies Kalman filtering when determining movement of the vehicle. In this way, noise in the detected position of the pixel pattern may be filtered to produce a more accurate determination of the vehicle's movement.

In embodiments, the vehicle movement sensor further includes a light source for lighting the first and/or second sample area. In this way, light may be applied to the sample areas in a consistent manner from a predetermined direction. As such, the reflections from surface asperities received by the imager are less prone to influence by external lighting conditions.

In embodiments, a vehicle movement sensor further includes a light source lens for focusing the light emitted by the light source onto the first and/or second sample area. In this way, the controlled light source may apply light to a concentrated area during sampling. In embodiments, the lens may be used to switch between applying light to the first sample area and the second sample area so that a single light source may be used to focus light intensely on one or the other of the areas.

In embodiments, the light source is one of an ultraviolet light source and an infrared light source. In such embodiments, an ultraviolet or infrared optoelectronic sensor may be used. In this way, a frequency of light different from light in the visible spectrum may be used to determine movements. As such, reflections from road surface received by the imager are less prone to influence by external lighting conditions.

In embodiments, the vehicle movement sensor further includes a shield formation for shielding the optoelectronic sensor. In this way, the optoelectronic sensor is protected from accumulation of debris during operation of the vehicle. As such, issues of the sampled image being compromised by dirt or other deposits on the optoelectronic sensor lens are mitigated. This may be advantageous in embodiments where the sensor is provided on the vehicle's undercarriage.

In embodiments, the processor has a sampling rate of 500 Hz or higher. In this way, pixel pattern images are taken rapidly to provide accurate movement determination, at higher speeds. The processing of the data at this rate is facilitated because the pixel pattern images may have a relatively low resolution, thereby minimising the complexity of image processing calculations.

In embodiments, the determined movement of the vehicle includes speed and yaw. In this way, both longitudinal and lateral movements of the vehicle may be determined, in contrast to conventional ABS sensors which may only provide for longitudinal measurements in the forward or reverse directions.

BRIEF DESCRIPTION OF THE DRAWINGS

Illustrative embodiments will now be described with reference to the accompanying drawings in which.

DETAILED DESCRIPTION

Figure 1:
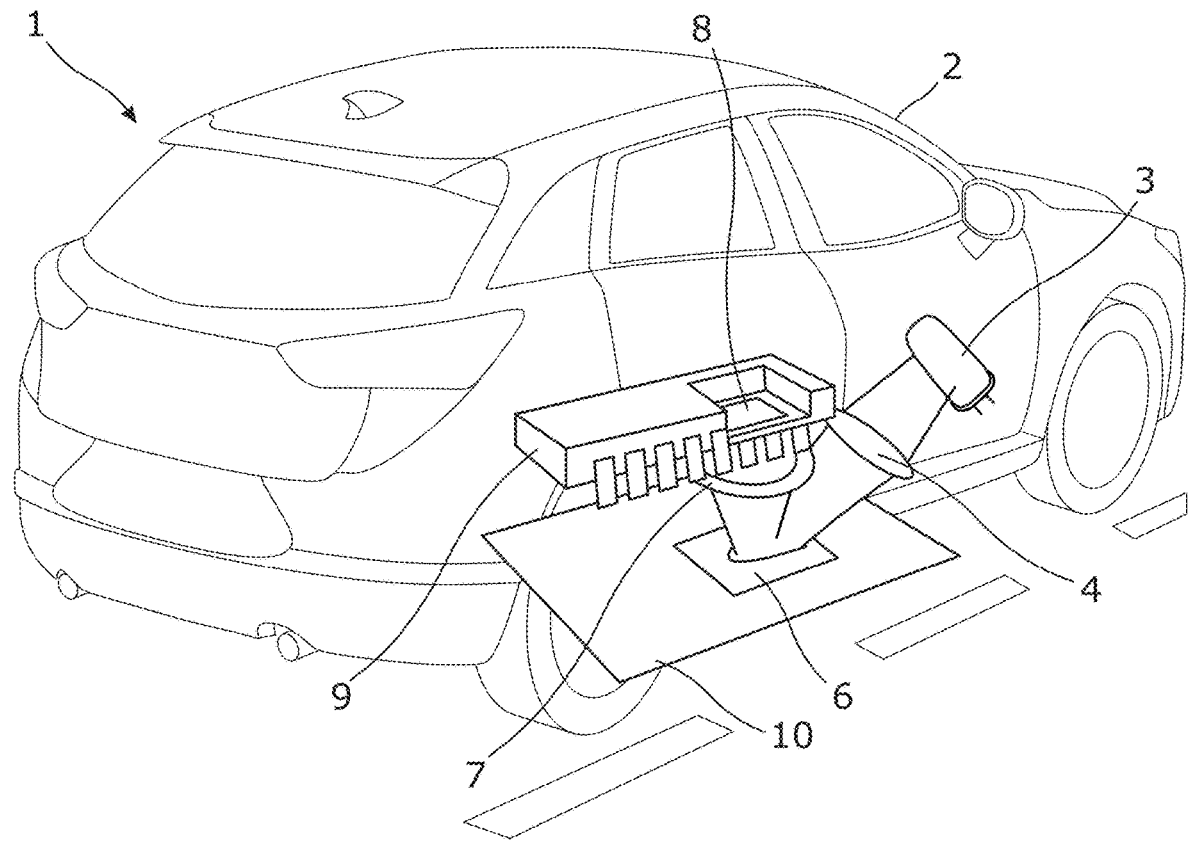
FIG. 1 shows a schematic illustration of a vehicle movement sensor according to a first embodiment.

FIG. 1 shows a schematic illustration of a vehicle movement sensor 1 incorporated into a vehicle 2. The components of the sensor 1 are shown enlarged for illustrative purposes and it will be understood that these components would be significantly smaller in reality.

The vehicle movement sensor 1 includes an image processor chip 9 incorporating a CMOS imager 8 which provides an optoelectronic sensor for detecting incoming light and outputting a pixel pattern image based on the detected light. The image processor chip is located in the centre of the undercarriage of the vehicle 2 such that the imager 8 receives light reflected up from the road surface 10. In this embodiment, the imager is an infrared imager.

An imager lens 7 is provided for focusing reflected infrared light from a sample area 6 of the road surface 10 the onto the imager 8. The sample area 6 is located at a predetermined position relative to the vehicle 2, and therefore as the vehicle 2 moves over the road surface 10, a different section of road will be sampled within the sample area 6.

In this embodiment, an infrared LED 3 is further provided for illuminating the sample area 6 with infrared light. In other embodiments, other light sources may be used, such as those including ultraviolet LEDs or broad-spectrum light sources. An illumination lens 4 is used to direct and focus infrared light onto the sample area 6, from where it is reflected back up onto the imager 8.

As will be understood, surfaces are not perfectly flat, and even smooth surfaces include asperities and compositional variances. This is especially true of road surfaces such as asphalt which are formed of mixtures of aggregates, binders, and cements. Furthermore, the road surface may also include textural features arising from, for instance, the processes used during its laying. For example, the drum of a road roller may produce a surface pattern. Equally, weathering of the road material may be more pronounced in the matrix surrounding aggregates, which may also result in differences in the surface. These variances result in surface irregularities. As such, when light is reflected off the road surface and onto the imager 8, it produces a pattern in the resultant pixel image formed by the imager 8. For example, a relatively smooth particle of aggregate or a levelled tip of an asperity may reflect a greater amount of light than surrounding roughened regions. This may therefore produce a cluster of brighter pixels surrounded by darker pixels in the pixel pattern image. Conversely, a cavity in road surface may produce a cluster of darker pixels surrounded by lighter pixels.

In use, the image processor chip 9 analyzes image frames detected by the imager 8. In this embodiment, this occurs at sample rate of 500 Hz. Each image will include a pixel pattern representative of the irregularities in the road surface 10 of the sample area 6. If the vehicle is stationary, the pixel pattern in successive images will remain substantially constant, tolerating for sensor noise and light output variance. Conversely, if the vehicle 2 moves, the physical area of road surface being sampled will be shifted in each frame such that the new section includes some of the previous region, as well as a newly sampled region of road. As such, the pixel pattern will be offset as the imager 8 moves relative to the surface producing those pattern features. As such, this offset may be used to determine movement of the vehicle relative to the road surface. That is, the image processor chip 9 applies digital image correlation of sequential sampled pixel pattern images to track movement of the vehicle based on the shifting of the pixel patterns in the sampled images.

Figure 2:
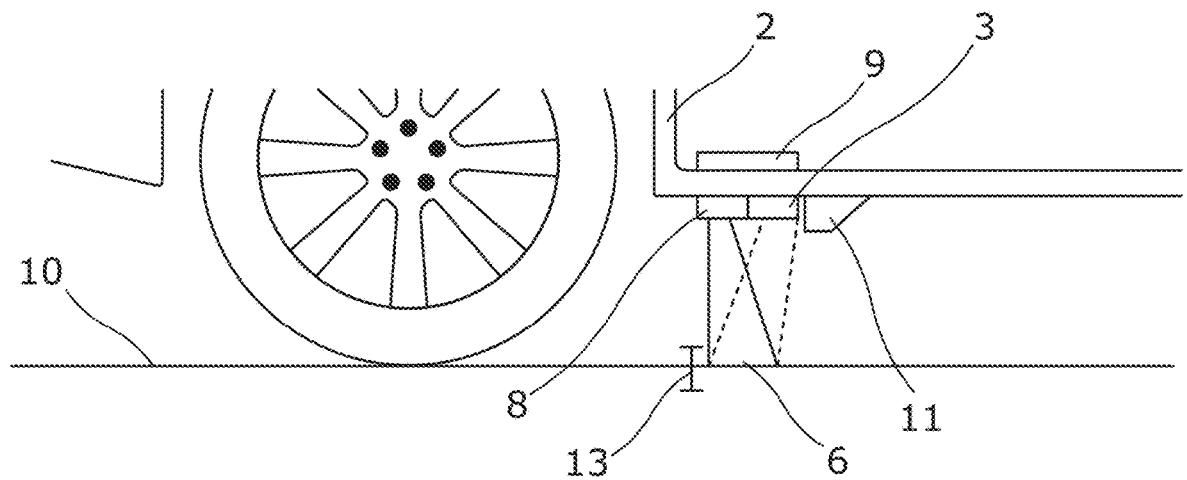
FIG. 2 shows a side view of the vehicle movement sensor of a second embodiment when a vehicle is travelling at low speed.

FIG. 2 shows a side view of the vehicle movement sensor of a second embodiment incorporated into a vehicle travelling at low speed. This embodiment is similar to the first embodiment except that the imager lens is incorporated into imager 8 as an imager assembly, and the illumination lens is incorporated into the light source 3. Furthermore, a shielding fin 11 is provided for diverting debris away from the light source 3 and imager 8.

The imager lens in this embodiment is a wide-angled fisheye lens such that the imager 8 can focus light from a wide area of the road surface. As with the first embodiment, infrared light is emitted from the light source 3 down onto the road surface 10. The light reflects back up to the imager 8, and the images are fed to the processor 9 for image processing. However, in this embodiment, because the imager 8 has a wide field of view, the complete received image is sectioned by the processor 9 and movement of the vehicle 2 is determined based on the section of the image corresponding to the sample area 6.

In this embodiment, the imager 8 is also configured to have a depth of field 13 of 5 cm either side of the road surface 10. This is to allow for variances in the height of the road surface 10, such as for speed bumps, as well as the vertical travel of the vehicle chassis as it moves up and down on its suspension. As such, the imager 8 may move vertically up or down by up to 5 cm without adversely compromising the pixel pattern produced in the sampled images. The image processor may account for changes in the relative size of pixel patterns as the sensor 8 moves vertically relative to the road surface 10.

As shown in FIG. 2, the sample area 6 is located substantially beneath the imager 8. This is effective for movement determination at lower speeds because the imager 8 has a relatively uniform view of the sample area 6. However, when the vehicle 2 is travelling at higher speeds, the rate at which the road surface 10 passes through the sample area 6 may be too fast for effective image processing. That is, the sample area 6 may pass over surface irregularities too quickly for the resulting pixel patterns to be accurately tracked in successive image frames. To mitigate this, the processor 9 may switch to determining movement based on the pixel pattern in a different section of the complete image corresponding to a different sample area 12 further away from the imager 8. This thereby increases the relative length of the sample area due to perspective, albeit that the resolution of the image is effectively reduced.

Figure 3:
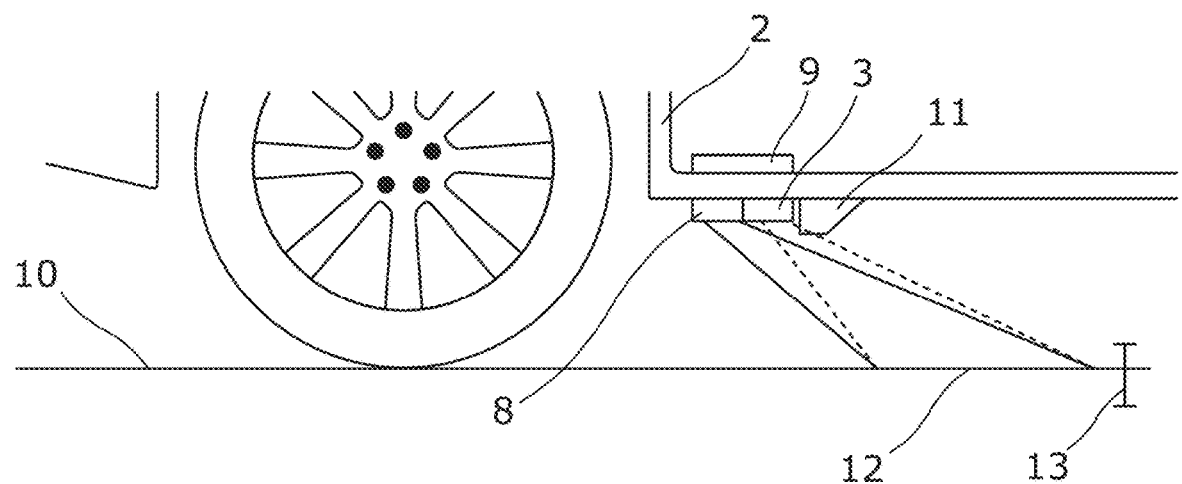
FIG. 3 shows a side view of the second embodiment when a vehicle is travelling at high speed.

In this connection, FIG. 3 shows such a scenario when the vehicle is traveling at higher speeds. That is, when the vehicle speed is above a threshold, the processor 9 is configured to switch from processing pixel pattern images from the first sample area shown in FIG. 2, to pixel pattern images corresponding to the second sample area 12 shown in FIG. 3. In this embodiment, the speed determination is based on the movement determined using first sample area images, although in other embodiments the switching may be controlled using another velocity sensor, such as GPS or ABS sensors. As with the scenario shown in FIG. 2, infrared light emitted from the light source 3 is reflected off the sample area 12 and reflects back up to the imager 8. The processor 9 similarly performs digital image correlation to determine movement of the vehicle, but this time based on the on the section of the image corresponding to the second sample area 12. In this way, the sensor may optically determine vehicle movement even at higher speeds. When the speed drops back below the threshold, the processor 9 may then switch back to processing pixel pattern images from the first sample area 6 shown in FIG. 2.

Figure 4:
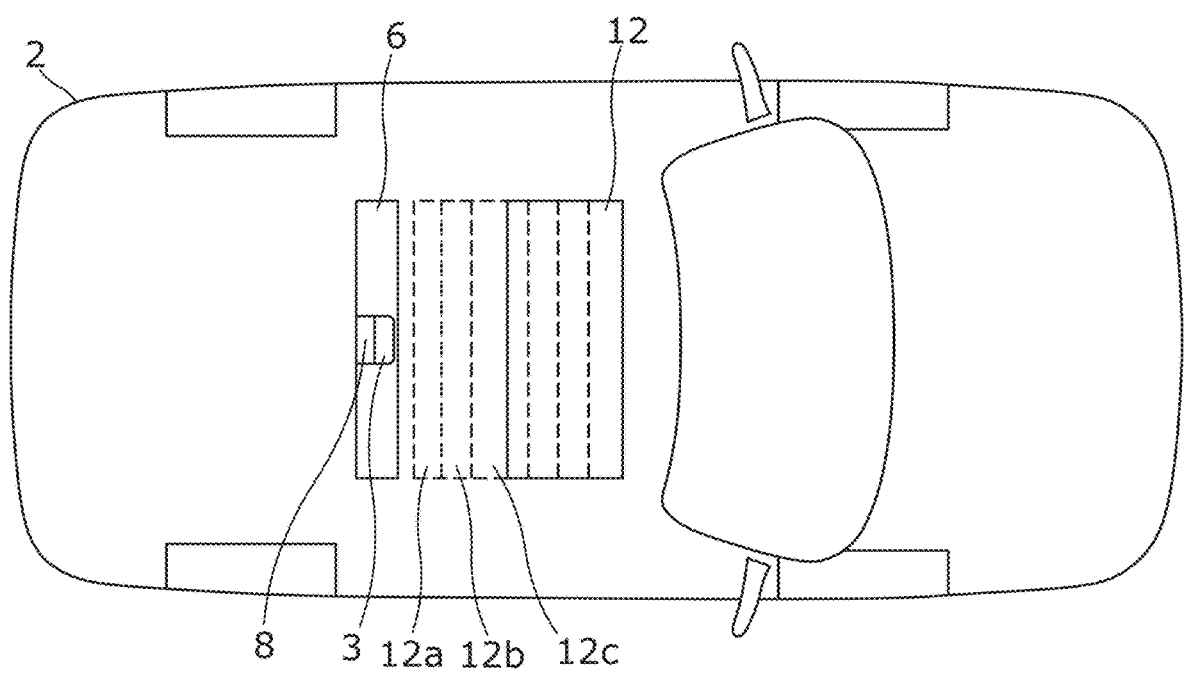
FIG. 4 shows a plan view of a vehicle incorporating a vehicle movement sensor according to a third embodiment.

FIG. 4 shows a plan view of a vehicle incorporating a motion sensor according to a third embodiment. Similar to the second embodiment, when the vehicle speed is above a threshold, the processor 9 switches to processing pixel pattern images corresponding to a second sample area 12. However, in this embodiment the position of the second sample area 12 relative to the imager 8 is proportional to the speed of the vehicle. That is, as the vehicle accelerates, the location of the second sample area is moved further away from the imager 8 to increase the length of the sample area. In this embodiment, the second sample area 12 transitions in stages dependent on vehicle speed from an initial location marked as 12a, though locations 12b and 12c, until the location reaches a maximum distance from the imager 8. As such, the accuracy of the movement sensor may be optimized for different speeds.

Accordingly, with the above arrangements, an optical movement sensor is provided which can accurately determine the vehicle's movement in both longitudinal and lateral directions, and at low and high speeds. As such, the movement sensor is particularly advantageous for use in autonomous driving systems, especially in conjunction with other sensors such as GPS and ABS. For example, the sensor may be especially beneficial at providing accurate measurement of movements at low speed and in shielded environments.

It will be understood that the embodiments illustrated above shows an application only for the purposes of illustration. In practice, embodiments may be applied to many different configurations, the detailed embodiments being straightforward for those skilled in the art to implement.

For example, although in the above embodiments a single optoelectronic sensor and light source are provided, it will be understood that other embodiments may include more than one. For example, a first optoelectronic sensor may be used for low-speed movement determination and a second may be used for high-speed movement determination. Equally, the sample areas do not necessarily need to be beneath the vehicle and embodiments may be provided where the sample area is ahead or behind the vehicle.

Furthermore, in embodiments a mechanism may be provided for moving the imager lens and/or the optoelectronic sensor itself for altering the location of the sample area.

What is claimed is:

1. A vehicle movement sensor comprising:
   an optoelectronic sensor configured to,
   receive light from a first sample area on a road surface at a first location relative to a vehicle and generate a pixel pattern image of road surface irregularities in the first sample area, and
   receive light from a second sample area on the road surface at a second location relative to the vehicle, wherein the second location is a different distance from the optoelectronic sensor than the first location; and
   a processor configured to,
   sample pixel pattern images of the first sample area and pixel pattern images of the second sample area, and
   determine movement of the vehicle using digital image correlation of sequential sampled pixel pattern images of one of the first sample area or the second sample area that is selected based on a vehicle speed of the vehicle.

2. The vehicle movement sensor according to claim 1, wherein the second location is a further from the optoelectronic sensor than the first location.

3. The vehicle movement sensor according to claim 2, wherein the processor is configured to,
   determine the movement of the vehicle using the digital image correlation of the sequential sampled pixel pattern images of the first sample area when the vehicle speed is below a predetermined threshold, and
   determine the movement of the vehicle using the digital image correlation of the sequential sampled pixel pattern images of the second sample area when the vehicle speed is above the predetermined threshold.

4. The vehicle movement sensor according to claim 3, wherein the processor is configured to increase a distance of the second location from the optoelectronic sensor proportionally to an increase in the vehicle speed above the predetermined threshold.

5. The vehicle movement sensor according to claim 2, the vehicle movement sensor further comprising a lens configured to focus light onto the optoelectronic sensor.

6. The vehicle movement sensor according to claim 5, wherein the lens and the optoelectronic sensor are configured to provide a depth of field of greater than 5 cm for the pixel pattern images of the first sample area.

7. The vehicle movement sensor according to claim 5, wherein the lens is configured to focus an image of the road surface onto the optoelectronic sensor to generate a focused image, the focused image encompassing the first sample area and the second sample area.

8. The vehicle movement sensor according to claim 1, wherein the optoelectronic sensor comprises a CMOS imager.

9. The vehicle movement sensor according to claim 1, wherein the processor is configured to apply Kalman filtering when determining movement of the vehicle.

10. The vehicle movement sensor according to claim 1, the vehicle movement sensor further comprising a light source configured to light the first or second sample area.

11. The vehicle movement sensor according to claim 10, the vehicle movement sensor further comprising a light source lens configured to focus the light emitted by the light source onto the first or second sample area.

12. The vehicle movement sensor according to claim 11, wherein the light source is one of an ultraviolet light source or an infrared light source.

13. The vehicle movement sensor according to claim 1, the vehicle movement sensor further comprising a shield formation configured to shield the optoelectronic sensor.

14. The vehicle movement sensor according to claim 1, wherein the processor has a sampling rate of 500 Hz or higher.

15. The vehicle movement sensor according to claim 1, wherein the determined movement of the vehicle comprises speed and yaw.

16. A method comprising:
   receiving, by a processor on a vehicle, pixel pattern images of road surface irregularities in a first sample area on a road surface at a first location relative to the vehicle, the pixel pattern images generated by an optoelectronic sensor on the vehicle;
   receiving, by the processor, pixel pattern images of road surface irregularities in a second sample area on the road surface at a second location relative to the vehicle, the pixel pattern images generated by the optoelectronic sensor;
   sampling, by the processor, the pixel pattern images of the first sample area and pixel pattern images of the second sample area; and
   determining movement of the vehicle using digital image correlation of sequential sampled pixel pattern images of one of the first sample area or the second sample area that is selected based on a vehicle speed of the vehicle.

17. The method of claim 16,
   wherein the second location is further from the optoelectronic sensor than the first location.

18. The method of claim 17, further comprising:
   determining the movement of the vehicle using the digital image correlation of the sequential sampled pixel pattern images of the first sample area, when the vehicle speed is below a predetermined threshold; and
   determining the movement of the vehicle using the digital image correlation of the sequential sampled pixel pattern images of the second sample area, when the vehicle speed is above the predetermined threshold.

19. The method of claim 18, further comprising:
   increasing, by the processor, a distance of the second location from the optoelectronic sensor proportionally to an increase in the vehicle speed above the predetermined threshold.

20. The method of claim 17, further comprising:
applying, by the processor, Kalman filtering when determining movement of the vehicle.

* * * * *

UNITED STATES PATENT AND TRADEMARK OFFICE
CERTIFICATE OF CORRECTION

| | | |
|---|---|---|
| PATENT NO. | : 12,030,503 B2 | Page 1 of 1 |
| APPLICATION NO. | : 17/652916 | |
| DATED | : July 9, 2024 | |
| INVENTOR(S) | : Tomasz Sulkowski | |

It is certified that error appears in the above-identified patent and that said Letters Patent is hereby corrected as shown below:

On the Title Page

Page 2, Column 1, Foreign Patent Documents, Line 2: Delete "106230018" and insert --H06230018-- therefor In the Claims Column 7, Line 44: In Claim 2, after "is", delete "a"

Signed and Sealed this
Eighth Day of April, 2025

Coke Morgan Stewart
*Acting Director of the United States Patent and Trademark Office*